Patented Jan. 31, 1933

1,895,775

UNITED STATES PATENT OFFICE

PRESTON R. SMITH, OF RAHWAY, NEW JERSEY, ASSIGNOR TO THE BARBER ASPHALT COMPANY, OF PHILADELPHIA, PENNSYLVANIA, A CORPORATION OF WEST VIRGINIA

BITUMINOUS EMULSION

No Drawing. Application filed January 26, 1927. Serial No. 163,836.

This invention relates to bituminous emulsions and their manufacture, including emulsions of pitches; tars and tar-like substances; resins; and other bituminous substances of natural and artificial origin, such as asphalt and asphaltic products. Such emulsions are used as binders, adhesives, and coating compositions, as well as for impregnating and surfacing purposes.

Hitherto, bituminous emulsions have generally been made by intimately mixing and emulsifying the desired bitumen in an aqueous solution of soap or saponaceous material. While many substances (saponaceous and other), have been suggested and tried as emulsifying agents, yet so far the bituminous emulsions formed with them have in general had one common defect: when the emulsion freezes and is subsequently thawed, it is found to have "broken", so that the bitumen is no longer completely emulsified, but has separated from the water to a greater or less extent.

This defect has largely prevented the shipment and use of bituminous emulsions during the winter months.

It is an object of this invention to produce improved bituminous emulsions, free from this defect of those heretofore in use. For this purpose I employ emulsifying agents prepared from an active principle of the waste sulphite liquor resulting from the sulphite process of making wood pulp. The exact composition of this liquor is still uncertain, although considerable study has been made of it. Its chief or characteristic constituent is a compound or mixture of compounds, of uncertain composition, usually called calcium (or magnesium) ligno-sulphonate,—which would appear to embody the active principle mainly responsible for the emulsifying agent hereinafter described. It is not necessary, however, to segregate this active principle for my purposes: on the contrary, it can be quite satisfactorily used in the presence of the rest of the liquor.

As it leaves the digestors, waste sulphite liquor is a dilute solution containing more or less free sulphur dioxide or sulphites; some sugars; resins; and the lignine of the wood,—all more or less altered or combined. The "waste sulphite liquor" of commerce is prepared from this crude, dilute digestor liquor by first neutralizing it, more or less, with lime or other alkali, and then concentrating it in vacuum pans: accordingly, it appears on the market (under a variety of names) in forms ranging, generally, from a somewhat viscous liquid to a dry powder.

For the purposes of this invention, any of these commercial forms of waste sulphite liquor may be used, or even the original crude, dilute product as it comes from the digestors. I have found that a suitable emulsifying agent or solution can be prepared by treating such liquor with various metal salts. When this is done, the added metal salt apparently re-acts with the calcium or magnesium salts (ligno-sulphonates) of the waste liquor; e. g., if a metallic sulphate is added, more or less of the corresponding metallic ligno-sulphonate is formed, and a corresponding amount of calcium sulphate. Being comparatively insoluble in water, the calcium sulphate may be removed by filtration. I have found, however, that for my purposes, such alkaline earth sulphates need not be removed. It is not necessary to use the metallic sulphate or other salts in proportions of exact chemical equivalence to the calcium ligno-sulphonate: on the contrary, considerably greater or smaller proportions of the added metallic sulphates may be used.

For example, take 50 lbs. of waste sulphite liquor, containing 2.1% calcium oxide, and 1.9% magnesium sulphite, and concentrated to 30° Bé., and add to it a solution of 50 lbs. ferrous sulphate dissolved in 430 lbs. water. After these have been thoroughly mixed (and preferably heated), 900 lbs. of asphalt may be emulsified in the solution in the usual manner, according to common practice in emulsification with soapy emulsifiers.

Emulsions of desirable characteristics can also be made with greater or less proportions of ferrous sulphate to sulphite liquor. In general, the proportions of emulsifying agent or solution best adapted for preparing an emulsion of a particular bituminous material may be varied within wide limits, being governed both by the physical properties desired for the finished emulsion and by the mechanical means (mixer) used to produce the emulsion,—less emulsifier being required with a highly effective mechanical device than with a less efficient one.

Besides ferrous salts or ferric salts, salts of the other metals of the third analytical group may be used, i. e., salts of aluminum and chromium. Salts of other acids besides sulphuric can, likewise, be employed in cases where the solubilities of the salts involved are such that the desired reaction will actually take place.

Bituminous emulsion prepared in accordance with my invention will be found to have all of the properties of such emulsions as heretofore made; and, in addition, can be repeatedly frozen and thawed out without "breaking" or other impairment: i. e., after freezing and thawing, my emulsions will be found to have the same properties as though never frozen at all.

It is to be understood that while I use the terms "ligno-sulphonate" and "ligno-sulphonic" acid to designate the substance or substances which yield my emulsifying agent as above described, in accordance with generally accepted views regarding the nature and composition of waste sulphite liquor, yet the correctness of these views or the formation of a ligno-sulphonic acid are immaterial to the successful practice of my invention.

Having thus described my invention, I claim:

1. A water - external - phase bituminous emulsion produced by the addition of a salt of a metal of the third analytical group to an approximately equal amount of concentrated waste sulphite liquor followed by the emulsification of bitumen with the resulting product.

2. A water - external - phase bituminous emulsion produced by the addition of a salt of iron to an approximately equal amount of concentrated waste sulphite liquor followed by the emulsification of bitumen with the resulting product.

3. A water - external - phase bituminous emulsion produced by the addition of ferrous sulphate to an approximately equal amount of concentrated waste sulphite liquor followed by the emulsification of bitumen with the resulting product.

4. A water - external - phase bituminous emulsion produced by the addition of a salt of aluminum to an approximately equal amount of waste sulphite liquor followed by the emulsification of bitumen for the resultant product.

5. A water - external - phase bituminous emulsion produced by the addition of aluminum sulphate to an approximately equal amount of waste sulphite liquor followed by the emulsification of bitumen for the resultant product.

6. A water - external - phase bituminous emulsion produced by the addition of a salt of chromium to an approximately equal amount of waste sulphite liquor followed by the emulsification of bitumen for the resultant product.

7. A water - external - phase bituminous emulsion produced by the addition of chromium sulphate to an approximately equal amount of waste sulphite liquor followed by the emulsification of bitumen for the resultant product.

In testimony whereof, I have hereunto signed my name at Maurer, New Jersey, this 23d day of Dec., 1926.

PRESTON R. SMITH.